G. HARER.
CONNECTION BETWEEN FINGER BAR HEADS AND SICKLE BAR HEADS FOR HARVESTERS.
APPLICATION FILED JUNE 21, 1917.
1,289,745.
Patented Dec. 31, 1918.
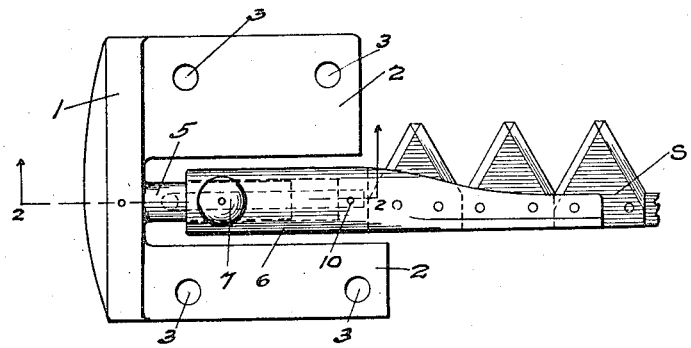
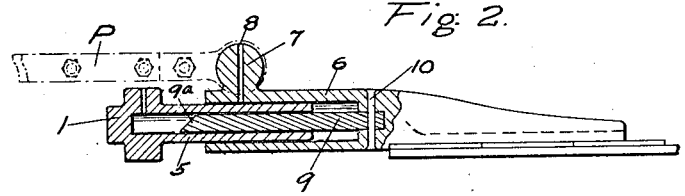
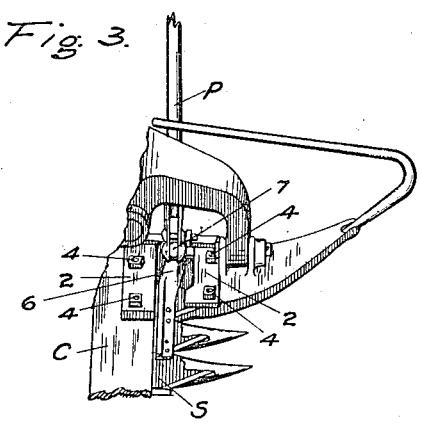
Grant Harer, Inventor,
By _____ Atty.

UNITED STATES PATENT OFFICE.

GRANT HARER, OF LONG CREEK, OREGON.

CONNECTION BETWEEN FINGER-BAR HEADS AND SICKLE-BAR HEADS FOR HARVESTERS.

1,289,745. Specification of Letters Patent. Patented Dec. 31, 1918.

Application filed June 21, 1917. Serial No. 176,224.

*To all whom it may concern:*

Be it known that I, GRANT HARER, a citizen of the United States, residing at Long Creek, Grant county, Oregon, have invented certain new and useful Improvements in Connections Between Finger-Bar Heads and Sickle-Bar Heads for Harvesters, of which the following is a specification.

My invention relates to the connections between a finger bar head and a sickle bar head of a mower, reaper, or other harvester in which a reciprocating sickle is used, and it has for its principal object to provide an improved construction, whereby to prevent dirt, grass and other matter from getting into the bearings and interfering with the operation of the sickle bar.

Another object of my invention is to provide a simple and practical construction which can be adapted to harvesting machines already in use by simply substituting my finger bar head and my sickle bar head for those now on the machine in use.

In order to fully illustrate my invention I have shown one practical embodiment thereof in the accompanying sheet of drawings, which I will now describe.

Figure 1 is a top plan view of my improved finger bar head and sickle bar head in operating positions, a fragmentary portion of a sickle bar being shown;

Fig. 2 is a vertical, sectional view thereof taken on line 2—2 of Fig. 1; and

Fig. 3 is a fragmentary view of a finger bar with my invention applied thereto.

Referring now more in detail to the drawings, my invention comprises a finger bar head 1, having wing portions 2—2, provided with bolt holes 3—3, to receive the bolts 4—4. Said finger bar head is also provided, between the wings 2—2, with a tubular bearing member 5, with which telescopes a tubular sickle bar head 6, provided on its top side with a driving ball 7, as shown, through which is an oil duct 8. Mounted centrally within said tubular sickle bar head 6, is a guide bearing bar 9, secured at its inner end to said sickle bar head as by means of a bolt 10. Said bearing bar 9 is preferably beveled on its outer end, as at 9ª, to facilitate its insertion into the tubular bearing member 5, forming a part of the finger bar head 1.

In use, the finger bar head 1, is bolted to the finger bar C, by means of the bolts 4—4, through the bolt holes 3—3, as clearly indicated in Fig. 3. The sickle bar head 6, is riveted to the sickle bar S, in the usual manner, and is put into place in the manner indicated in Figs. 1 and 2, the bearing bar 9, of the sickle bar head telescoping within the tubular bearing member 5, while the tubular sickle bearing head 6, telescopes over said tubular bearing member 5. The driving pitman P, is secured to the ball 7.

With this construction and arrangement it will be seen that the sickle bar is firmly held and guided in its reciprocating movements and that a very little place is left for dirt and other matter to get into the machine so as to interfere with the driving action of the pitman P and the sickle bar S.

While I have illustrated one practical embodiment of my invention, I do not limit it to the details as here shown, except as I may be limited by the hereto appended claims.

I claim:

1. In combination with the finger bar and the sickle bar of a harvesting machine, a finger bar head having spaced side wings adapted to be bolted to said finger bar head and having a bearing member projecting therebetween, a tubular sickle bar head secured to said sickle bar and having telescoping, sliding engagement over said projecting bearing member, and a driving member on the top side of said tubular sickle bearing head, substantially as described.

2. In combination with the finger bar and sickle bar of a harvesting machine, a finger bar head having spaced wing portions adapted to be secured to said finger bar and having a tubular bearing member projecting therefrom, a tubular sickle bar head secured to said sickle bar and adapted to have telescoping, sliding engagement over said tubular bearing member, an inner bearing bar mounted within said tubular sickle bar head and adapted to have telescoping engagement within said tubular bearing member, and a bearing ball on said tubular sickle bar head for driving the same, substantially as described.

Signed at Long Creek, Grant county, Oregon, this 12th day of June, 1917.

GRANT HARER.

In presence of—
VICTOR GUNTER,
BERT SCROGGINS.

Copies of this patent may be obtained for five cents each, by addressing the "Commissioner of Patents, Washington, D. C."